Nov. 10, 1970  J. CRAWFORD  3,539,986
PORTABLE LANDING ZONE
Filed March 23, 1967
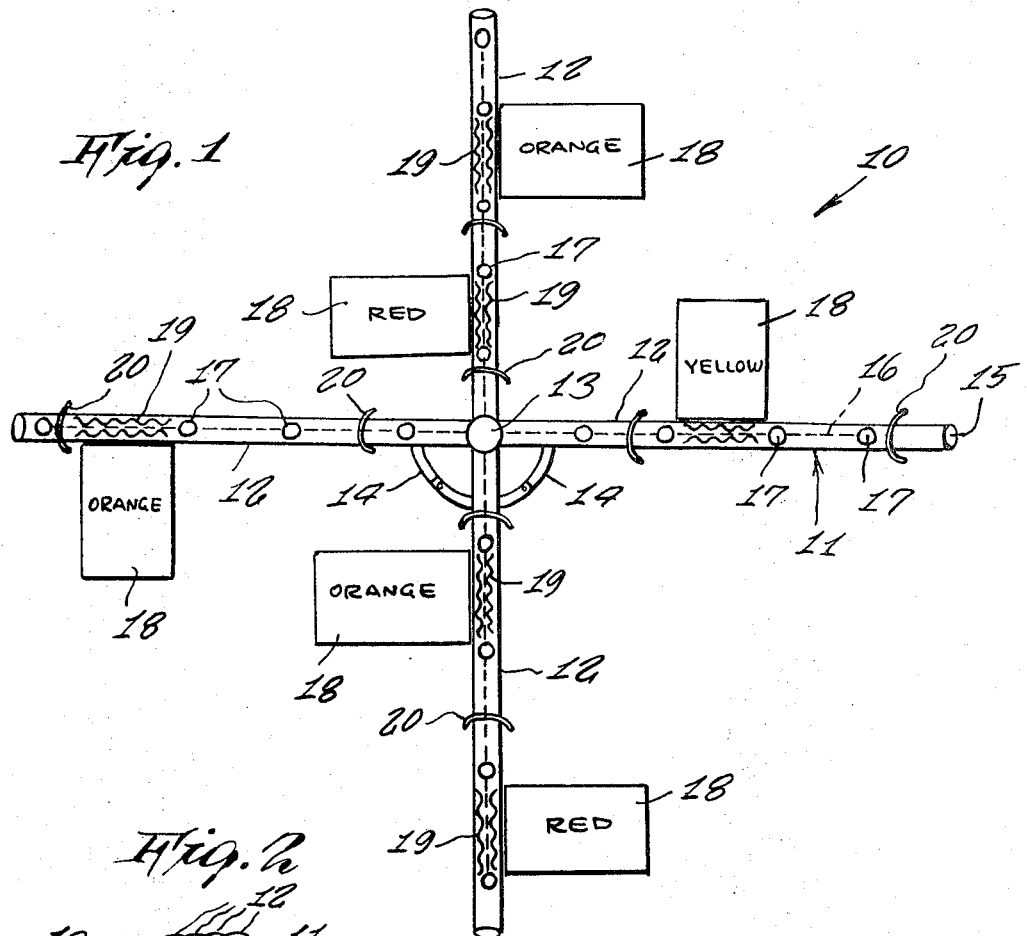
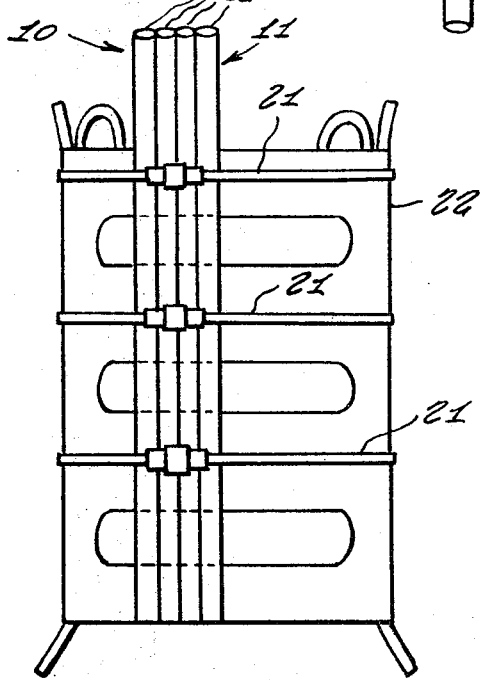
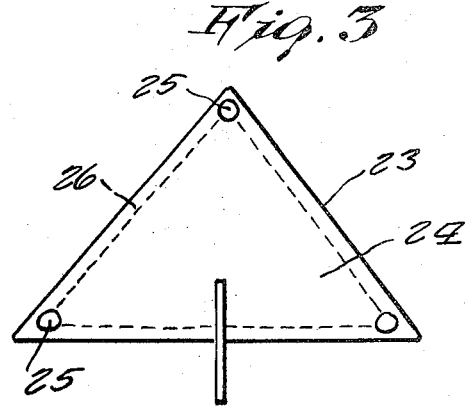
INVENTOR
JESSE CRAWFORD 3,539,986
PORTABLE LANDING ZONE
Jesse Crawford, c/o Marine Detachment,
Portsmouth, N.H. 03801
Filed Mar. 23, 1967, Ser. No. 625,490
Int. Cl. B64f 1/18
U.S. Cl. 340—26                    5 Claims

ABSTRACT OF THE DISCLOSURE

A portable indicator, for identifying an aircraft landing field and including a frame formed of pipes, several air panels of different colors secured to the pipes, and wiring carried through said pipes for illuminating a series of lamps positioned along the length of the pipes so to guide an aircraft in take off and in landing.

---

This invention relates generally to air field indicators.

A principal object of the present invention is to provide a portable landing zone with a purpose of identifying a landing area to an aircraft in a region where there is no established air port.

Another object of the present invention is to provide a portable landing zone which includes a frame formed of pipe and having a plurality of air panels of various colors secured thereto so to identify to an airplane the location of the landing zone.

Yet another object of the present invention is to provide a landing zone including electrical circuit carried within said pipe frame for illuminating a plurality of lamps mounted along the length of the pipe frame thus enabling the device to be seen in the darkness.

Yet a further object of the present invention is to provide a portable landing zone which is readily collapsible and which may accordingly be carried upon a pack board.

Yet another object of the present invention is to provide a portable landing zone which will be particularly adaptable for purposes in regions where there are no established airports.

Other objects of the present invention are to provide a portable landing zone which is simple in design, inexpensive to manufacture, rugged in construction, easy to use and efficient in operation.

These and other objects will be readily evident upon a study of the following specifications and the accompanying drawings wherein;

FIG. 1 is an extended, opened out view of a portable landing zone,

FIG. 2 is an elevation view thereof shown collapsed and folded up, the same being mounted upon a pack board for transportation by an individual, FIG. 3 is a side elevation view of a modified form of the present invention.

Referring now to the drawing in detail, and more particular to FIGS. 1 and 2, the reference numeral 10 will represent a portable landing zone according to the present invention wherein there is a frame 11 formed from a plurality of aluminum pipes 12 collected together about a common swivel 13, the pipes 12 extending in a cross configuration therefrom, the pipes being movable between a collapsed end and extended position, as shown in FIG. 1 about the swivel and maintained in extended position of folding arms 14.

Each of the pipes has an elongated hollow chamber 15 extending therethrough within which an electric wire 16 is extended for delivering electrical power to a plurality of lamps 17 mounted along the length of the pipes 12, the central opening 15 further including a means for storage of flash light batteries, a flicker type blinker and electric switch, all of which are in electrical circuit so as to provide a means for illuminating the lamps 17.

A plurality of air panels 18 are secured along the length of each of the pipes 12, each of the air panels being of either of various different colors such as orange, red, yellow and the like. Each of the air panels 18 is secured to the pipes 12 by means of springs 19.

A pair of clamps 20 are fitted around each of the pipes 12 and provide a means for securing the frame 11 to a supporting surface.

In operative use, the frame 11 is spread out into a cross configuration as shown in FIG. 1 and wherein the arms 12 extend radially about a swivel 13 after which a switch is turned to an on position so as to deliver electric light source to the bulbs within lamps 17 there by providing a means for obtaining a portable landing zone for use of aircraft.

When the device is not in use, and it is necessary to transport the same from one location to another, the same may be readily collapsed about the swivel 13 by means of folding the arms 14, after which the collapsed may be inserted in collapsed position under a plurality of straps 21 of a pack board 22 as shown in FIG. 2 of the drawing, thereby providing a convenient means for transporting the portable landing zone from one area to another.

In FIG. 3, a modified form of the present invention is shown wherein the portable landing zone 23 is of triangular configuration and includes a frame 24 upon which lamps 25 are secured and electrically connected by means of electric wire 26 to a battery source and switch in a manner above described by the structure 10.

It is of course understood that when the device is collapsed into a portable position that the air panels may be rolled up and placed within the pipes 12 for purpose of convenient transportation thereof. The device may be made in any size and it is suggested that the pipes may be of six foot lengths if so preferred. Furthermore, if preferred, each of the air panels may be made to roll up like a window screen so to fit within the pipes 12 when in a collapsed position. It is to be further noted that the lamps 17 may include bulbs which are of approximately the size of Christmas tree bulbs and which are located in a position depressed within the pipes, each of the bulb openings in the pipe being rubber lined.

I claim:

1. In a portable landing zone, the combination of a frame, said frame comprised of a plurality of pipes, said pipes being movable relative to each other about a swivel so that said frame may be selectively made between an extended or collapsed position, said frame being of cross configuration when opened up, each of said pipes having a plurality of lamps mounted along the length thereof and a central opening extending therethrough and containing electrical wiring, electric batteries, a flicker type blinker, and a switch, each of which are in an electrical circuit for providing a means for illuminating said lamps along said length of said pipes.

2. The combination as set forth in claim 1, wherein a pair of clamps is fitted around each of said pipes for purpose of securement to a supporting surface.

3. The combination as set forth in claim 2, wherein said frame is provided with a plurality of pairs of folding arms for maintaining said frame in an extended position for operative use, said folding arms being foldable for collapsing said frame.

4. The combination as set forth in claim 1, wherein said plurality of lamps are mounted in a position depressed within the pipes whereby the lamps are protected by the pipes from damage when the frame is in a collapsed position.

5. The combination as set forth in claim 4, wherein said pipes include a plurality of openings in the wall thereof and wherein said lamps are mounted in said openings.

References Cited

UNITED STATES PATENTS

| | | | |
|---|---|---|---|
| 1,644,547 | 10/1927 | Smith | 240—1.2 X |
| 1,869,922 | 8/1932 | Soucek | 240—1.2 |
| 2,148,695 | 2/1939 | Ishibashi | 340—140 X |
| 2,634,399 | 4/1953 | Stocker | 240—1.2 X |
| 3,183,479 | 5/1965 | Austin | 240—1.2 X |
| 3,197,757 | 7/1965 | Porta | 340—321 |

ALVIN H. WARING, Primary Examiner

M. SLOBASKY, Assistant Examiner

U.S. Cl. X.R.

240—1.2; 340—114, 321